(12) United States Patent
Venkatraman et al.

(10) Patent No.: US 9,014,974 B2
(45) Date of Patent: Apr. 21, 2015

(54) PREDICTIVE SCHEDULING OF NAVIGATION TASKS

(71) Applicant: QUALCOMM Incorporated, San Diego, CA (US)

(72) Inventors: Sai Pradeep Venkatraman, Santa Clara, CA (US); Lionel Jacques Garin, Palo Alto, CA (US); Gengsheng Zhang, Cupertino, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 13/653,263

(22) Filed: Oct. 16, 2012

(65) Prior Publication Data

US 2014/0107919 A1 Apr. 17, 2014

(51) Int. Cl.
*G01C 21/16* (2006.01)
*G01C 21/00* (2006.01)
*G01S 5/02* (2010.01)
(Continued)

(52) U.S. Cl.
CPC .............. *G01C 21/00* (2013.01); *G01S 5/0263* (2013.01); *G01S 19/48* (2013.01); *G01S 19/45* (2013.01); *G01S 19/42* (2013.01); *G01S 19/31* (2013.01); *G01S 19/26* (2013.01); *G01C 21/20* (2013.01); *G01C 21/206* (2013.01)

(58) Field of Classification Search
CPC ..... G01S 5/0263; G01S 5/0278; G01S 19/48; G01S 19/45; G01S 19/42; G01S 19/26; G01S 19/31; G01C 21/20; G01C 21/26; G01C 21/206; H04W 4/028
USPC .......................... 701/466, 468, 469, 470, 472; 455/456.1, 456.2, 456.3, 456.6; 342/357.28
See application file for complete search history.

(56) References Cited

U.S. PATENT DOCUMENTS 5,594,951 A  1/1997 Bellin
5,604,708 A  2/1997 Helms et al.
(Continued)

FOREIGN PATENT DOCUMENTS

EP  2046087 A1  4/2009
EP  2072950 A2  6/2009
(Continued)

OTHER PUBLICATIONS

International Search Report and Written Opinion—PCT/US2013/059643—ISAEPO—Jan. 8, 2014.
(Continued)

*Primary Examiner* — Russell Frejd
(74) *Attorney, Agent, or Firm* — Hunter Clark PLLC

(57) ABSTRACT

Disclosed are systems, apparatus, devices, methods, computer program products, and other implementations, including a method of controlling navigation tasks on a mobile device that includes obtaining data representative of a route of travel for the mobile device, obtaining a list of navigation tasks associated with the route of travel for the mobile device, and performing one or more navigation tasks in accordance with the list of navigation tasks based, at least in part, on proximity of the mobile device to one or more points on the route of travel. Performing the one or more navigation tasks includes one or more of, for example, obtaining satellite positioning assistance data in response to a determination that the mobile device is transitioning from an indoor area to an outdoor area, and/or establishing a communication link with an access point.

49 Claims, 6 Drawing Sheets

(51) Int. Cl.

| | | |
|---|---|---|
| *G01S 19/48* | (2010.01) | |
| *G01S 19/45* | (2010.01) | |
| *G01S 19/42* | (2010.01) | |
| *G01S 19/31* | (2010.01) | |
| *G01S 19/26* | (2010.01) | |
| *G01C 21/20* | (2006.01) | |

(56) References Cited

U.S. PATENT DOCUMENTS

| | | | |
|---|---|---|---|
| 5,714,870 A | 2/1998 | Dunstan | |
| 5,848,364 A | 12/1998 | Ohashi | |
| 5,883,594 A | 3/1999 | Lau | |
| 5,947,775 A | 9/1999 | Yamamoto et al. | |
| 5,953,677 A | 9/1999 | Sato | |
| 6,097,958 A | 8/2000 | Bergen | |
| 6,408,196 B2 | 6/2002 | Sheynblat et al. | |
| 6,710,578 B1 | 3/2004 | Sklovsky | |
| 7,057,372 B2 | 6/2006 | Chen et al. | |
| 7,271,765 B2 | 9/2007 | Stilp et al. | |
| 7,359,713 B1 | 4/2008 | Tiwari | |
| 7,783,302 B2 | 8/2010 | Hupp et al. | |
| 7,848,270 B2 | 12/2010 | Hilmersson | |
| 7,873,349 B1 | 1/2011 | Smith et al. | |
| 7,953,459 B2 | 5/2011 | Kim et al. | |
| 8,060,108 B1* | 11/2011 | Rayburn et al. | 455/456.1 |
| 8,072,379 B2 | 12/2011 | Gopinath | |
| 8,195,468 B2* | 6/2012 | Weider et al. | 704/275 |
| 8,214,139 B2* | 7/2012 | Yonker et al. | 701/470 |
| 8,214,910 B1 | 7/2012 | Gossweiler, III | |
| 8,472,973 B2 | 6/2013 | Lin et al. | |
| 8,744,804 B2 | 6/2014 | Messenger et al. | |
| 2001/0041960 A1 | 11/2001 | Hashida | |
| 2003/0104849 A1 | 6/2003 | Arimitsu | |
| 2004/0192330 A1 | 9/2004 | Gaal | |
| 2004/0198386 A1 | 10/2004 | Dupray | |
| 2005/0037775 A1 | 2/2005 | Moeglein et al. | |
| 2005/0060088 A1* | 3/2005 | Helal et al. | 701/208 |
| 2005/0130677 A1 | 6/2005 | Meunier et al. | |
| 2006/0125644 A1 | 6/2006 | Sharp | |
| 2006/0255963 A1 | 11/2006 | Thompson et al. | |
| 2007/0037610 A1 | 2/2007 | Logan | |
| 2007/0089065 A1* | 4/2007 | Lane et al. | 715/764 |
| 2007/0178913 A1 | 8/2007 | Niemenmaa et al. | |
| 2008/0162034 A1 | 7/2008 | Breen | |
| 2009/0143018 A1 | 6/2009 | Anderson et al. | |
| 2009/0164115 A1 | 6/2009 | Kosakowski et al. | |
| 2009/0164120 A1 | 6/2009 | Boore et al. | |
| 2009/0213004 A1 | 8/2009 | Rhodes et al. | |
| 2009/0216438 A1 | 8/2009 | Shafer | |
| 2009/0286549 A1 | 11/2009 | Canon et al. | |
| 2010/0069062 A1 | 3/2010 | Horn et al. | |
| 2010/0087230 A1* | 4/2010 | Peh et al. | 455/566 |
| 2010/0106603 A1* | 4/2010 | Dey et al. | 705/14.63 |
| 2010/0161831 A1* | 6/2010 | Haas et al. | 709/235 |
| 2010/0197321 A1 | 8/2010 | Kim et al. | |
| 2010/0240391 A1 | 9/2010 | Povey | |
| 2010/0241496 A1* | 9/2010 | Gupta et al. | 705/14.1 |
| 2011/0172906 A1 | 7/2011 | Das et al. | |
| 2011/0177809 A1 | 7/2011 | Pakzad et al. | |
| 2011/0178701 A1* | 7/2011 | Gupta et al. | 701/204 |
| 2011/0239026 A1 | 9/2011 | Kulik | |
| 2011/0307891 A1 | 12/2011 | Orr et al. | |
| 2012/0064922 A1 | 3/2012 | Podoloff et al. | |
| 2012/0100895 A1 | 4/2012 | Priyantha et al. | |
| 2012/0130632 A1 | 5/2012 | Bandyopadhyay et al. | |
| 2012/0143495 A1 | 6/2012 | Dantu | |
| 2012/0157113 A1* | 6/2012 | Brisebois et al. | 455/456.1 |
| 2012/0176525 A1* | 7/2012 | Garin et al. | 348/333.02 |
| 2012/0203453 A1 | 8/2012 | Lundquist et al. | |
| 2012/0268249 A1 | 10/2012 | Kansal et al. | |
| 2013/0017840 A1 | 1/2013 | Moeglein et al. | |
| 2014/0106677 A1 | 4/2014 | Altman | |
| 2014/0129175 A1 | 5/2014 | Poduri et al. | |

FOREIGN PATENT DOCUMENTS

| | | |
|---|---|---|
| EP | 2270535 A2 | 1/2011 |
| EP | 2293016 A2 | 3/2011 |
| EP | 2648389 A1 | 10/2013 |
| JP | 9005102 A | 1/1997 |
| WO | 2010025467 A1 | 3/2010 |
| WO | 2011107652 A1 | 9/2011 |
| WO | 2012001215 A1 | 1/2012 |

OTHER PUBLICATIONS

International Search Report and Written Opinion—PCT/US2012/068279—ISA/EPO—Apr. 8, 2013.

Application as Filed in U.S. App. No. 13/325,698, Arnold J Gum, Location and event triggered navigation dormancy and wakeup, dated Dec. 14, 2011.

Kong J., et al., "Ubiquitous Interacting Object: A Distributed and Localized Approach to Building Ubiquitous Computing Applications," ACM Transactions on Interactive Intelligent Systems, 2013, pp. 1-25.

* cited by examiner

LIST OF NAVIGATION TASKS

| Task set ID No. | Performance Location | Tasks to be Performed |
|---|---|---|
| 1. | Point A location | Obtain assistance data for middle floor of the indoor structure 310;<br>Activate / reconfigure transceiver of the device 308 to establish communication with access point 306b;<br>Deactivate / reconfigure transceiver of the device 308 to suspend / drop communication link with access point 306a |
| 2. | Point B location | Obtain assistance data for bottom floor of the indoor structure 310;<br>Activate / reconfigure transceiver of the device 308 to establish communication with access point 306c;<br>Deactivate / reconfigure transceiver of the device 308 to suspend / drop communication link with access point 306b |
| 3. | Point C location | Acquire and/or compute satellite positioning assistance data;<br>Activate SPS receiver;<br>Obtain assistance data for outdoor area outside structure 310 |
| 4. | Point D location | Activate / reconfigure transceiver of the device 308 to establish communication with access point 304;<br>Deactivate / reconfigure transceiver of the device 308 to suspend / drop communication link with access point 306c;<br>Acquire signals from SPS satellites |

*FIG. 4*

PREDICTIVE SCHEDULING OF NAVIGATION TASKS

BACKGROUND

Mobile devices are often configured to enable position determination and navigation functionality in one or more geographical environment types (e.g., indoor, outdoor) and/or one or more operational environments (e.g., to be configured to communicate and operate with different types of communication networks/technologies). However, when a mobile device is configured to operate in more than one geographical and/or operational environment, there may be a delay, or a pause, in the device's operations as the device transitions from one environment to the other. Such a delay or pause may be due to the time it takes the device to obtain information relevant to the new environment (e.g., map information, signal acquisition information) and/or the delay in performing various tasks required to enable the device to operate in the newly transitioned environment (e.g., establishing communication links, determining its position, etc.) Additionally, when a device is configured to operate in more than one environment, there may be some power waste if the device continues operating sensors and other modules that are not required for proper operation of the device in its current environment, but are required for proper operation in one of the other environments the device is configured to operate in.

SUMMARY

In some variations, a method of controlling navigation tasks on a mobile device is disclosed. The method includes obtaining data representative of a route of travel for the mobile device, obtaining a list of navigation tasks associated with the route of travel for the mobile device, and performing one or more navigation tasks in accordance with the list of navigation tasks based, at least in part, on proximity of the mobile device to one or more points on the route of travel. Performing the one or more navigation tasks includes one or more of, for example, obtaining satellite positioning assistance data in response to a determination that the mobile device is transitioning from an indoor area to an outdoor area, and/or establishing a communication link with an access point.

Embodiments of the method may include at least some of the features described in the present disclosure, including one or more of the following features.

The mobile device may include a plurality of units and may be configured to operate in multiple positioning modes. The list of navigation tasks may include control data to control activation of at least one of the plurality of units during travel of the mobile device along the route of travel.

The plurality of units may include one or more of, for example, a pressure sensor, an accelerometer, a magnetometer, a gyroscope, an indoor positioning receiver, a global navigation satellite system (GNSS) receiver, and/or a communication transceiver.

Performing the one or more navigation tasks may include controlling activation of the at least one of the plurality of units based, at least in part, on the list of navigation tasks. Controlling the activation of the at least one of the plurality of units may include causing one of, for example, enabling the at least one of the plurality of units, disabling the at least one of the plurality of units, or preventing the activation of the at least one of the plurality of units.

The method may further include obtaining a revised list of navigation tasks in response to a determination that the mobile device is in a non-predicted location that deviates from the route of travel for the mobile device.

The method may further include activating one or more units of the mobile device in response to a determination that the mobile device is in a non-predicted location that deviates from the route of travel for the mobile device.

Activating the one or more units of the mobile device may include activating one or more inactive transceivers of the mobile device.

The method may further include determining location of the mobile device based, at least in part, on location information determined based on measurements performed by the mobile device.

Performing the one or more navigation tasks may include performing the one or more navigation tasks at one or more of, for example, various points of the route of travel, and/or various points of time during travel of the mobile device along the route of travel.

Performing the one or more navigation tasks may include controlling activation of at least one of positioning modes of the mobile device based, at least in part, on determined location of the mobile device.

Performing the one or more navigation tasks may include performing initialization of at least one unit of the mobile device, calibrating the at least one unit of the mobile device, and activating the at least one unit of the mobile device.

Performing the one or more navigation tasks may include requesting assistance data in response to a determination that the mobile device is located proximate to a point on the route of travel preceding another point on the route of travel corresponding to an area associated with the requested assistance data, and receiving the requested assistance data.

Obtaining the satellite positioning assistance data may include determining satellite availability data based on the determined location of the device, and determining a subset of satellites based on the determined satellite availability data.

The method may further include determining that the device is transitioning from the indoor area to the outdoor area based, at least in part, on one or more of, for example, the list of navigation tasks, the determined location of the device, and/or current time.

Obtaining the list of navigation tasks may include generating at least part of the list of navigation tasks at one or more of, for example, the mobile device, and/or a remote server in communication with the mobile device.

In some variations, a mobile device is disclosed. The device includes one or more processors, and storage media comprising computer instructions. The computer instructions, when executed on the one or more processors, cause operations that include obtaining data representative of a route of travel for the mobile device, obtaining a list of navigation tasks associated with the route of travel for the mobile device, and performing one or more navigation tasks in accordance with the list of navigation tasks based, at least in part, on proximity of the mobile device to one or more points on the route of travel. Performing the one or more navigation tasks includes one or more of, for example, obtaining satellite positioning assistance data in response to a determination that the mobile device is transitioning from an indoor area to an outdoor area, and/or establishing a communication link with an access point.

Embodiments of the device may include at least some of the features described in the present disclosure, including at least some of the features described above in relation to the method.

In some variations, a communication apparatus is disclosed. The apparatus includes means for obtaining data representative of a route of travel for a mobile device, means for obtaining a list of navigation tasks associated with the route of travel for the mobile device, and means for performing one or more navigation tasks in accordance with the list of navigation tasks based, at least in part, on proximity of the mobile device to one or more points on the route of travel. The means for performing the one or more navigation tasks include one or more of, for example, means for obtaining satellite positioning assistance data in response to a determination that the mobile device is transitioning from an indoor area to an outdoor area, and/or means for establishing a communication link with an access point.

Embodiments of the apparatus may include at least some of the features described in the present disclosure, including at least some of the features described above in relation to the method and the device, as well as one or more of the following features.

The apparatus may further include means for activating one or more units of the mobile device in response to a determination that the mobile device is in a non-predicted location that deviates from the route of travel for the mobile device.

The means for activating may include means for activating one or more inactive transceivers of the mobile device.

The apparatus may further include means for determining location of the mobile device based, at least in part, on location information determined based on measurements performed by the mobile device.

The means for performing the one or more navigation tasks may further include means for performing the one or more navigation tasks at one or more of, for example, various points of the route of travel, and/or various points of time during travel of the mobile device along the route of travel.

The means for performing the one or more navigation tasks may further include means for requesting assistance data in response to a determination that the mobile device is located proximate to a point on the route of travel preceding another point on the route of travel corresponding to an area associated with the requested assistance data, and means for receiving the requested assistance data.

The means for obtaining the satellite positioning assistance data may include means for determining satellite availability data based on determined location of the device, and determining a subset of satellites based on the determined satellite availability data.

The apparatus may further include means for determining that the device is transitioning from the indoor area to the outdoor area based, at least in part, on one or more of, for example, the list of navigation tasks, the determined location of the device, and/or current time.

The means for obtaining the list of navigation tasks may include means for generating at least part of the list of navigation tasks at one or more of, for example, the mobile device, and/or a remote server in communication with the mobile device.

In some variations, a non-transitory processor-readable media is disclosed. The processor-readable media is programmed with a set of instructions executable on a processor that, when executed, cause operations including obtaining data representative of a route of travel for a mobile device, obtaining a list of navigation tasks associated with the route of travel for the mobile device, and performing one or more navigation tasks in accordance with the list of navigation tasks based, at least in part, on proximity of the mobile device to one or more points on the route of travel. Performing the one or more navigation tasks includes one or more of, for example, obtaining satellite positioning assistance data in response to a determination that the mobile device is transitioning from an indoor area to an outdoor area, and/or establishing a communication link with an access point.

Embodiments of the processor-readable media may include at least some of the features described in the present disclosure, including at least some of the features described above in relation to the method, device, and apparatus.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or ±0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or ±0.1% from the specified value, as such variations are appropriate to in the context of the systems, devices, circuits, methods, and other implementations described herein.

As used herein, including in the claims, "or" or "and" as used in a list of items prefaced by "at least one of" or "one or more of" indicates that any combination of the listed items may be used. For example, a list of "at least one of A, B, or C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, or C" may also include AA, AAB, AAA, BB, etc.

Other and further objects, features, aspects, and advantages of the present disclosure will become better understood with the following detailed description of the accompanying drawings.

BRIEF DESCRIPTION OF THE DRAWING

FIG. 4 is an example embodiment of a list of navigation tasks.

Like reference symbols in the various drawings indicate like elements.

DESCRIPTION

Figure 1:
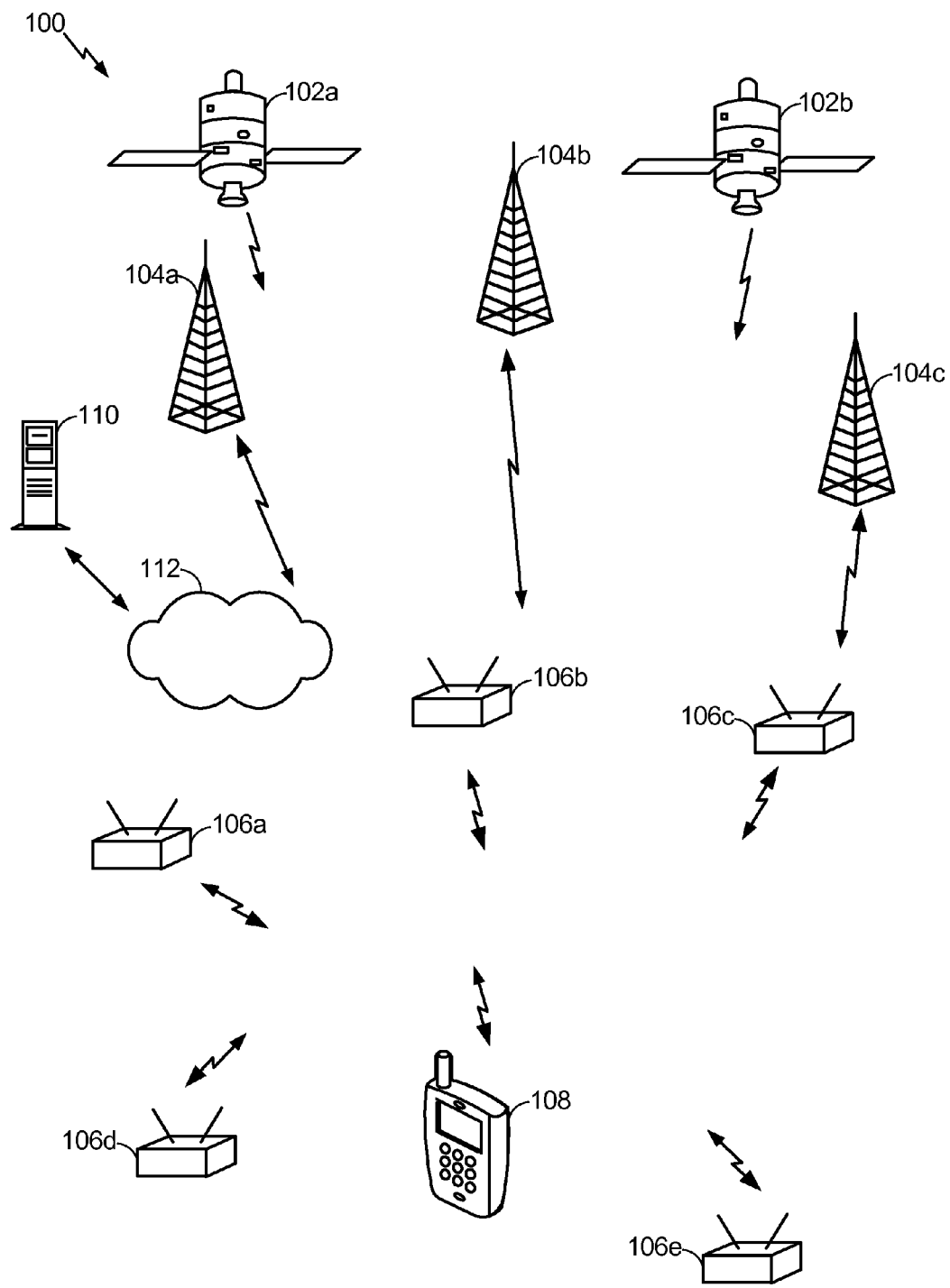
FIG. 1 is a schematic diagram of an example system that includes a mobile device.

The present disclosure is directed to systems, devices, methods, and other implementations to predictively determine navigation tasks that need to be performed along a route of travel for a device (e.g., a mobile device). Such predictive/ preemptive navigation tasks, include activating or deactivating particular sensors or receivers depending on where the device is, obtaining map information for a particular area in which the device will be traveling prior to arriving at that area, etc. For example, pressure sensors may not be needed if the route stays on one level of a building, and a GNSS receiver may not be needed when the device remains indoors. In Another example, when a device transitions from an indoor to an outdoor environment, a location manager (or a controller on the device) may be configured to obtain assistance data (as required) when the device is still indoors.

Predictive scheduling of navigation tasks can enable managing operations of multiple sensors (e.g., positioning sensors) and other modules/systems of the device, as well as handling seamless indoor/outdoor routing of such a device, to limit power consumption, expedite location determination functionality, etc. In some implementations, a location manager (which may be operating in the mobile device, or in a remote computing device) is configured to generate/create a list of navigation tasks to control, among other things, switching between various operational modes of the device, activating/deactivating sensors and/or other device units, etc. Such a list/schedule/plan of navigation tasks may be revised if a change in the user's route is detected. In implementations in which the navigation tasks include downloading assistance data (or other types of navigational data), a location manager may determine which assistance data to download, and a sequence to perform this download if download time is an issue. The amount of assistance data may restrict the device from downloading assistance data for multiple route areas (e.g., for multiple floors) at once. If the route to be traveled by the user is pre-determined, the location manager can schedule when and where to request the data for the upcoming areas (e.g., floors) that the wireless device will travel through. A controller of the device may also implement a routing procedure to control the activation of various modules/systems/sensors of the device so as to control, for example, the on/off state of each individual system/module/sensor, schedule the initialization and calibration for the different systems/modules/sensors, handle transitions between systems/modules/sensors, etc.

Accordingly, systems, apparatus, devices, methods, and other implementations are described herein, including a method to control navigation tasks on a mobile device that includes obtaining data representative of a route of travel for the mobile device, obtaining a list of navigation tasks associated with the route of travel for the mobile device, and performing one or more navigation tasks in accordance with the list of navigation tasks based, at least in part, on proximity of the mobile device to one or more points on the route of travel. Performing the navigation tasks may include one or more of, for example, obtaining satellite positioning assistance data in response to a determination that the mobile device is transitioning from an indoor area to an outdoor area, and/or establish a communication link with an access point. In some embodiments, the mobile device may include a plurality of units (e.g., sensors, receivers, and other device units) and may be configured to operate in multiple positioning modes. In such embodiments, the list of navigation tasks may include, for example, control data to control the activation of at least one of the plurality of units during travel of the mobile device along the route of travel. In some embodiments, the one or more navigation tasks performed by the mobile device may include requesting assistance data (e.g., map data) in response to a determination that the mobile device is located proximate to a point on the route of travel preceding another point on the route of travel corresponding to an area associated with the requested assistance data, and receiving the requested assistance data.

With reference to FIG. 1, a schematic diagram of an example system 100 and various environments in which a mobile device 108 operates is shown. The mobile device (also referred to as a wireless device or as a mobile station) 108 may be configured to operate and interact with multiple types of other communication systems/devices, including local area network devices (or nodes), such as WLAN for indoor communication, femtocells, Bluetooth-based transceivers, and other types of indoor communication network nodes, wide area wireless network nodes, satellite communication systems, etc., and as such the mobile device 108 may include one or more interfaces to communicate with the various types of communications systems. As used herein, communication system/devices with which the mobile device 108 may communicate are also referred to as access points (AP's).

The mobile device is also configured to obtain a list of navigation tasks (generated/derived by a controller/processor of the mobile device and/or generated/derived remotely by a server, such as a location manager) based on a predicted/expected route of travel determined for the mobile device. Such an expected/predicted route of travel may be determined by computing a route between a start and destination point (which may be provided by a user) based on map data available at the determining device (e.g., the mobile device and/or a remote server). In circumstances where more than one route of travel between the start and destination points is possible or available, the selected route of travel may be a route that meets some pre-determined criteria (e.g., shortest route, fastest route, etc.) The generated list/schedule of navigation tasks may associate certain tasks that are to be performed along the route of travel. A controller of the mobile device 108 may perform the navigation tasks based on the list of navigation tasks obtained, and based on a determination that the mobile device is proximate certain points along the route of travel with respect to which particular navigation tasks have been planned or scheduled. For example, when it is determined that the mobile device is proximate a point along the route of travel that precedes a location where the mobile will transition from an indoor to an outdoor environment, a navigation task, associated with that point, of activating a global navigation satellite system (GNSS) receiver, may be performed. Another task associated with that point may be to obtain (e.g., download) assistance data (including, for example, map data) corresponding to the outdoor area that the mobile device is about to enter, and/or obtaining assistance data to facilitate a quick fix on satellite signals available at the outdoor area that device is about to enter. By predictively/preemptively performing these tasks prior to the mobile device reaching the outdoor environment (where the mobile device would require to have its GNSS receiver activated, and may require assistance data), a more efficient (e.g., from a power consumption perspective) and expedient performance of position determination operations of the mobile device may be achieved. As another example, when it is determined that the mobile device is located proximate a particular point that corresponds to an outdoor location along the route of travel, a task associate with that point may be to deactivate a WiFi transceiver that was used by the mobile device while it was traveling in the indoor portion of the route travel. In some embodiments, when it is determined that the mobile device is proximate a point along the route of travel that precedes a location where the mobile will transition from an outdoor to an indoor environment or from one indoor environment to another, one task associated with that point may be to obtain (e.g., download)

assistance data corresponding to the indoor area that the mobile device is about to enter. This assistance data may include, for example, heat maps for one or more WiFi access points pertaining to expected RSSI and ranges for the indoor area, floor maps, access point related parameters such as processing gain, transmit power, RTT turnaround calibration functions, etc.

As noted, the system 100 may contain one or more different types of wireless communication systems or nodes. Such nodes, also referred to as wireless access points (or WAPs) may include LAN and/or WAN wireless transceivers, including, for example, WiFi base stations, femto cell transceivers, Bluetooth transceivers, cellular base stations, WiMax transceivers, etc. Thus, for example, and with continued reference to FIG. 1, the system 100 may include Local Area Network Wireless Access Points (LAN-WAPs) 106a-e that may be used for wireless voice and/or data communication with the mobile device 108. The LAN-WAPs 106a-e may also be utilized, in some embodiments, as independents sources of position data, e.g., through implementation of multilateration-based procedures based, for example, on time of arrival techniques. The LAN-WAPs 106a-e can be part of a Wireless Local Area Network (WLAN), which may operate in buildings and perform communications over smaller geographic regions than a WWAN. Additionally in some embodiments, the LAN-WAPs 106a-e could also be pico or femto cells. In some embodiments, the LAN-WAPs 106a-e may be part of, for example, WiFi networks (802.11x), cellular piconets and/or femtocells, Bluetooth Networks, etc. The LAN-WAPs 106a-e can also include a Qualcomm indoor positioning system (QUIPS™). A QUIPS implementation may, in some embodiments, be configured according to a client-server architecture where a client (e.g., the mobile device) can communicate with a server that provides the client with data (such as to provide the assistance data, e.g., maps, RF heat-maps, connectivity information, etc.) for a particular floor or some other region where the mobile device is located. Although five (5) LAN-WAP access points are depicted in FIG. 1, any number of such LAN-WAP's may be used, and, in some embodiments, the system 100 may include no LAN-WAPs access points at all, or may include a single LAN-WAP access point. Furthermore, each of the LAN-WAPs 106a-e depicted in FIG. 1 may be a moveable node, or may be otherwise capable of being relocated.

As further shown in FIG. 1, the system 100 may also include, in some embodiments, a plurality of one or more types of Wide Area Network Wireless Access Points (WAN-WAPs) 104a-c, which may be used for wireless voice and/or data communication, and may also serve as another source of independent information through which the mobile device 108 may determine its position/location. The WAN-WAPs 104a-c may be part of wide area wireless network (WWAN), which may include cellular base stations, and/or other wide area wireless systems, such as, for example, WiMAX (e.g., 802.16). A WWAN may include other known network components which are not shown in FIG. 1. Typically, each WAN-WAPs 104a-104c within the WWAN may operate from fixed positions, and provide network coverage over large metropolitan and/or regional areas. Although three (3) WAN-WAPs are depicted in FIG. 1, any number of such WAN-WAPs may be used. In some embodiments, the system 100 may include no WAN-WAPs at all, or may include a single WAN-WAP. Additionally, each of the WAN-WAPs 104a-c depicted in FIG. 1 may be a moveable node, or may otherwise capable of being relocated.

Communication to and from the mobile device 108 (to exchange data, enable position determination of the device 108, etc.) may thus also be implemented, in some embodiments, using various wireless communication networks such as a wide area wireless network (WWAN), a wireless local area network (WLAN), a wireless personal area network (WPAN), and so on. The term "network" and "system" may be used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may also be implemented, at least in part, using an IEEE 802.11x network, and a WPAN may be a Bluetooth network, an IEEE 802.15x, or some other type of network. The techniques described herein may also be used for any combination of WWAN, WLAN and/or WPAN.

When deriving position using the access points 104a-b and/or 106a-e, the mobile device 108 may utilize time of arrival techniques, optionally with the assistance of a positioning server 110 and a network 112. The positioning server (also referred to as a location manager) 110 may communicate with the mobile device 108 through the network 112. The positioning server may also be configured, in some embodiments, to determine routes of travel for one or more mobile devices (such as the mobile device 108) and/or generate lists of navigation tasks that are to be performed along the determined routes of travel for those one or more mobile devices.

In some embodiments, and as further depicted in FIG. 1, the mobile device 108 may also be configured to at least receive information from a Satellite Positioning System (SPS) 102a-b, which may be used as an independent source of position information for the mobile device 108. The mobile device 108 may thus include one or more dedicated SPS receivers specifically designed to receive signals for deriving geo-location information from the SPS satellites. Thus, in some embodiments, the mobile device 108 may communicate with any one or a combination of the SPS satellites 102a-b, the WAN-WAPs 104a-c, and/or the LAN-WAPs 106a-e. In some embodiments, each of the aforementioned systems can provide an independent information estimate of the position for the mobile device 108 using different techniques. In some embodiments, the mobile device may combine the solutions derived from each of the different types of access points to improve the accuracy of the position data.

In embodiments in which the mobile device 108 can receive satellite signals, the mobile device may utilize a receiver (e.g., a GNSS receiver) specifically implemented for use with the SPS to extract position data from a plurality of signals transmitted by SPS satellites 102a-b. Transmitted satellite signals may include, for example, signals marked with a repeating pseudo-random noise (PN) code of a set number of chips and may be located on ground based control stations, user equipment and/or space vehicles. Satellite positioning systems may include such systems as the Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like.

In some embodiments, the techniques/procedures presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS.

As used herein, a mobile device or station (MS) refers to a device such as a cellular or other wireless communication device, personal communication system (PCS) device, personal navigation device (PND), Personal Information Manager (PIM), Personal Digital Assistant (PDA), a tablet device, a laptop or some other suitable mobile device which is capable of receiving wireless communication and/or navigation signals, such as navigation positioning signals. The term "mobile station" (or "mobile device") is also intended to include devices which communicate with a personal navigation device (PND), such as by short-range wireless, infrared, wireline connection, or other connection, regardless of whether satellite signal reception, assistance data reception, and/or position-related processing occurs at the device or at the PND. Also, "mobile station" is intended to include all devices, including wireless communication devices, computers, laptops, tablet, etc., which are capable of communication with a server, such as via the Internet, WiFi, or other network, regardless of whether satellite signal reception, assistance data reception, and/or position-related processing occurs at the device, at a server, or at another device associated with the network. Any operable combination of the above are also considered a "mobile station."

Figure 2:
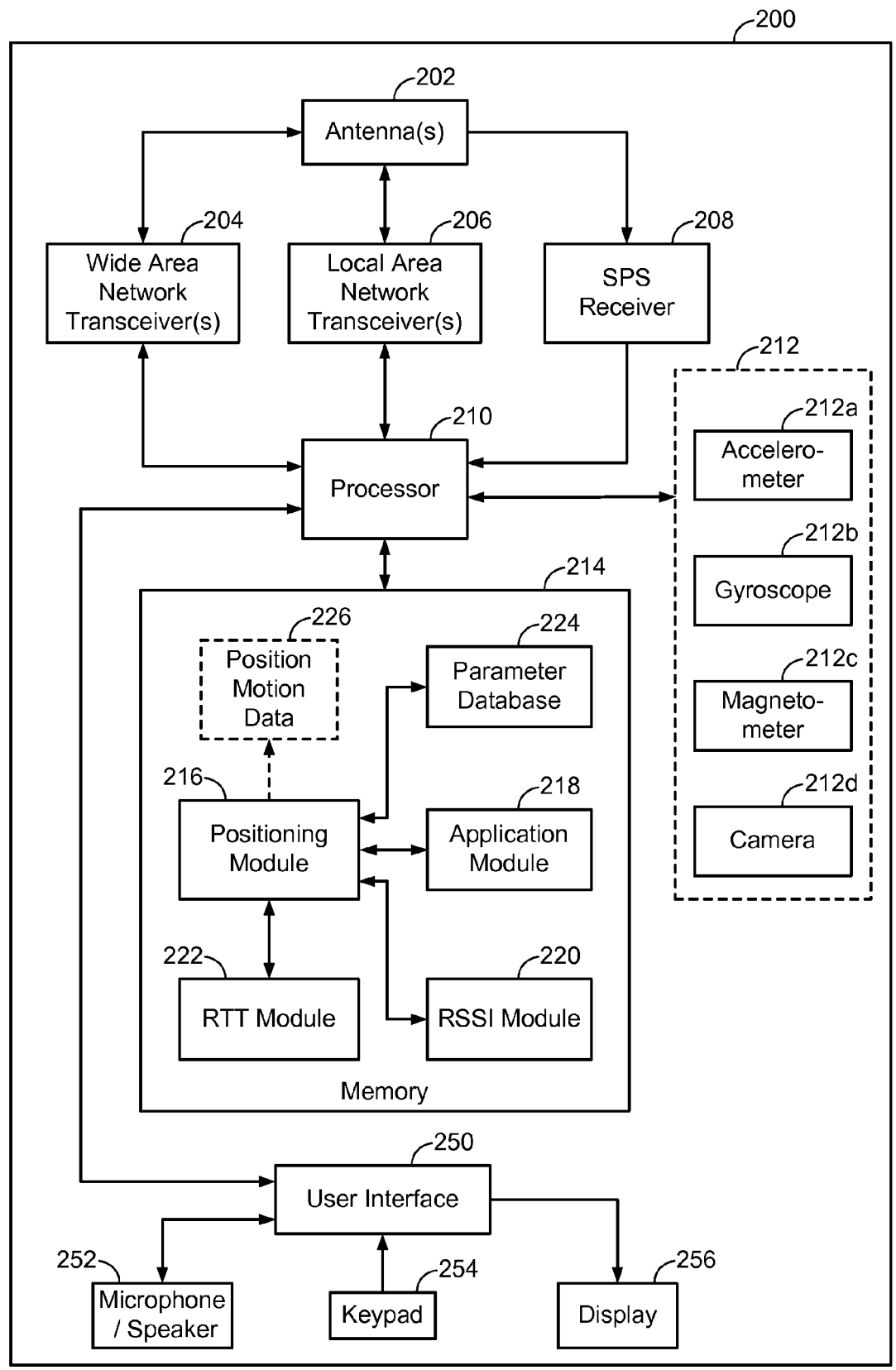
FIG. 2 is a schematic diagram of an example mobile device.

With reference now to FIG. 2, a schematic diagram illustrating various components of an example mobile device 200, which may be similar to the mobile device 108 of FIG. 1, is shown. For the sake of simplicity, the various features/components/functions illustrated in the box diagram of FIG. 2 are connected together using a common bus to represent that these various features/components/functions are operatively coupled together. Other connections, mechanisms, features, functions, or the like, may be provided and adapted as necessary to operatively couple and configure a portable wireless device. Furthermore, one or more of the features or functions illustrated in the example of FIG. 2 may be further subdivided, or two or more of the features or functions illustrated in FIG. 2 may be combined. Additionally, one or more of the features or functions illustrated in FIG. 2 may be excluded.

As shown, the mobile device 200 may include one or more local area network transceivers 206 that may be connected to one or more antennas 202. The one or more local area network transceivers 206 comprise suitable devices, hardware, and/or software for communicating with and/or detecting signals to/from one or more of the LAN-WAPs 106a-e depicted in FIG. 1, and/or directly with other wireless devices within a network. In some embodiments, the local area network transceiver(s) 206 may comprise a WiFi (802.11x) communication transceiver suitable for communicating with one or more wireless access points; however, in some embodiments, the local area network transceiver(s) 206 may be configured to communicate with other types of local area networks, personal area networks (e.g., Bluetooth), etc. Additionally, any other type of wireless networking technologies may be used, for example, Ultra Wide Band, ZigBee, wireless USB, etc.

The mobile device 200 may also include, in some implementations, one or more wide area network transceiver(s) 204 that may be connected to the one or more antennas 202. The wide area network transceiver 204 may comprise suitable devices, hardware, and/or software for communicating with and/or detecting signals from one or more of, for example, the WAN-WAPs 104a-c illustrated in FIG. 1, and/or directly with other wireless devices within a network. In some implementations, the wide area network transceiver(s) 204 may comprise a CDMA communication system suitable for communicating with a CDMA network of wireless base stations. In some implementations, the wireless communication system may comprise other types of cellular telephony networks, such as, for example, TDMA, GSM, etc. Additionally, any other type of wireless networking technologies may be used, including, for example, WiMax (802.16), etc.

In some embodiments, an SPS receiver (also referred to as a global navigation satellite system (GNSS) receiver) 208 may also be included with the mobile device 200. The SPS receiver 208 may be connected to the one or more antennas 202 for receiving satellite signals. The SPS receiver 208 may comprise any suitable hardware and/or software for receiving and processing SPS signals. The SPS receiver 208 may request information as appropriate from the other systems, and may perform the computations necessary to determine the position of the mobile device 200 using, in part, measurements obtained by any suitable SPS procedure.

In some embodiments, the mobile device 200 may also include one or more sensors 212 coupled to a processor 210. For example, the sensors 212 may include motion sensors to provide relative movement and/or orientation information which is independent of motion data derived from signals received by the wide area network transceiver(s) 204, the local area network transceiver(s) 206 and/or the SPS receiver 208. By way of example but not limitation, the motion sensors may include an accelerometer 212a, a gyroscope 212b, a geomagnetic (magnetometer) sensor 212c (e.g., a compass), an altimeter (e.g., a barometric pressure altimeter), and/or other sensor types. In some embodiments, the accelerometer 212a may be implemented based on micro-electro-mechanical-system (MEMS). Other types of accelerometers may be used in place of, or in addition to MEMS-based accelerometer. Additionally, a 3D accelerometer, comprising three perpendicularly placed accelerometers, may be implemented. In some embodiments, the gyroscope 212b may include a gyroscope based on MEMS technology, and may be a single-axis gyroscope, a double-axis gyroscope, or a 3-D gyroscope configured to sense motion about, for example, three orthogonal axes. Other types of gyroscopes may be used in place of, or in addition to MEMS-based gyroscope. In some embodiments, a magnetometer, configured to measure a magnetic field intensity and/or direction (and, thus, may be configured to measure absolute orientation with respect to the magnetic north) may also be implemented based on MEMS technology. Such MEMS-base magnetometers may be configured to detect motion caused by the Lorentz force produced by a current through a MEMS conductor. Other types of magnetometers may also be used. An altimeter may, for example, be configured to provide altitude data and thus may facilitate determining a floor in an indoor structure (e.g., a shopping mall) where the device may be located. Based on data representative of altitude measurements performed by the altimeter, navigation tasks, such as obtaining assistance data (including maps) for a particular floor in the indoor structure (e.g., a floor along the path traversed by the user) may be performed. The output of the one or more sensors 212 may be combined in order to provide motion information. For example, estimated position of the mobile device 200 may be determined based on a previously determined position and the distance traveled from that previously determined position as determined from the motion information derived from measurements by at least one of the one or more sensors. As further shown in FIG. 2, in some embodiments, the one or more sensors 212 may also include a camera 212d (e.g., a charge-couple device (CCD)-type camera), which may produce still or moving images (e.g., a video sequence) that may be displayed on a user interface device, such as a display or a screen.

The processor(s) (also referred to as a controller) 210 may be connected to the local area network transceiver(s) 206, the wide area network transceiver(s) 204, the SPS receiver 208 and the one or more sensors 212. The processor may include one or more microprocessors, microcontrollers, and/or digital signal processors that provide processing functions, as well as other calculation and control functionality. The processor 210 may also include storage media (e.g., memory) 214 for storing data and software instructions for executing programmed functionality within the mobile device. The memory 214 may be on-board the processor 210 (e.g., within the same IC package), and/or the memory may be external memory to the processor and functionally coupled over a data bus. Further details regarding an example embodiment of a processor or computation system, which may be similar to the processor 210, are provided below in relation to FIG. 6.

A number of software modules and data tables may reside in memory 214 and be utilized by the processor 210 in order to manage both communications with remote devices/nodes (such as the various access points depicted in FIG. 1), positioning determination functionality, and/or device control functionality based, for example, on a list of navigation tasks obtained by the mobile device 200. As illustrated in FIG. 2, memory 214 may include a positioning module 216, an application module 218, a received signal strength indicator (RSSI) module 220, and/or a round trip time (RTT) module 222. It is to be noted that the functionality of the modules and/or data structures may be combined, separated, and/or be structured in different ways depending upon the implementation of the mobile device 200. For example, the RSSI module 220 and/or the RTT module 222 may each be realized, at least partially, as a hardware-based implementation, and may thus include such devices as a dedicated antenna (e.g., a dedicated RTT and/or RSSI antenna), a dedicated processing unit to process and analyze signals received and/or transmitted via the antenna(s) (e.g., to determine signal strength of a received signals, determine timing information in relation to an RTT cycle), etc.

The application module 218 may be a process running on the processor 210 of the mobile device 200, which requests position information from the positioning module 216. Applications typically run within an upper layer of the software architectures, and may include indoor navigation applications, shopping applications, location aware service applications, etc. The positioning module 216 may derive the position of the mobile device 200 using information derived from various receivers and modules of the mobile device 200. For example, to determine the mobile device's position based on RTT measurements, reasonable estimates of processing time delays introduced by each access point, may first be obtained and used to calibrate/adjust the measured RTTs. The measured RTTs may be determined by the RTT module 222, which can measure the timings of signals exchanged between the mobile device 200 and the access points to derive round trip time (RTT) information. In some embodiments, once measured, the RTT values may be passed to the positioning module 216 to assist in determining the position of the mobile device 200. As noted, in some embodiments, position determination, including position determination based on RTT measurements, may be performed by a remote server such as the positioning server 110 of FIG. 1.

Other information that may be determined from communications received by the mobile device 200 (e.g., using one of its transceivers) includes the received signal power, which may be represented in the form of RSSI (determined using the RSSI module 220). The RSSI module 220 may also provide data regarding the signals to the positioning module 216. When using RSSI measurements to determine a mobile device's position, appropriate calibration/adjustment procedures may need to be performed. A determined position of the mobile device 200 may then be provided to the application module 218.

In some embodiments, the mobile device 200 may also be configured to receive supplemental information that includes auxiliary position and/or motion data which may be determined from other sources (e.g., the sensors 212). Such auxiliary position data may be incomplete or noisy, but may be useful as another source of independent information for estimating the processing times of the WAPs. As illustrated in FIG. 2 (using dashed lines), mobile device 200 may optionally store auxiliary position/motion data 226 in memory which may be derived from information received from other sources as described below. Supplemental information may also include, but not be limited to, information that can be derived or based upon Bluetooth signals, beacons, RFID tags, and/or information derived from map (e.g., receiving coordinates from a digital representation of a geographical map by, for example, a user interacting with a digital map).

The mobile device 200 may further include a user interface 250 which provides any suitable interface systems, such as a microphone/speaker 252, keypad 254, and display 256 that allows user interaction with the mobile device 200. The microphone/speaker 252 provides for voice communication services (e.g., using the wide area network transceiver(s) 204 and/or the local area network transceiver(s) 206). The keypad 254 comprises any suitable buttons for user input. The display 256 comprises any suitable display, such as, for example, a backlit LCD display, and may further include a touch screen display for additional user input modes.

Figure 3:
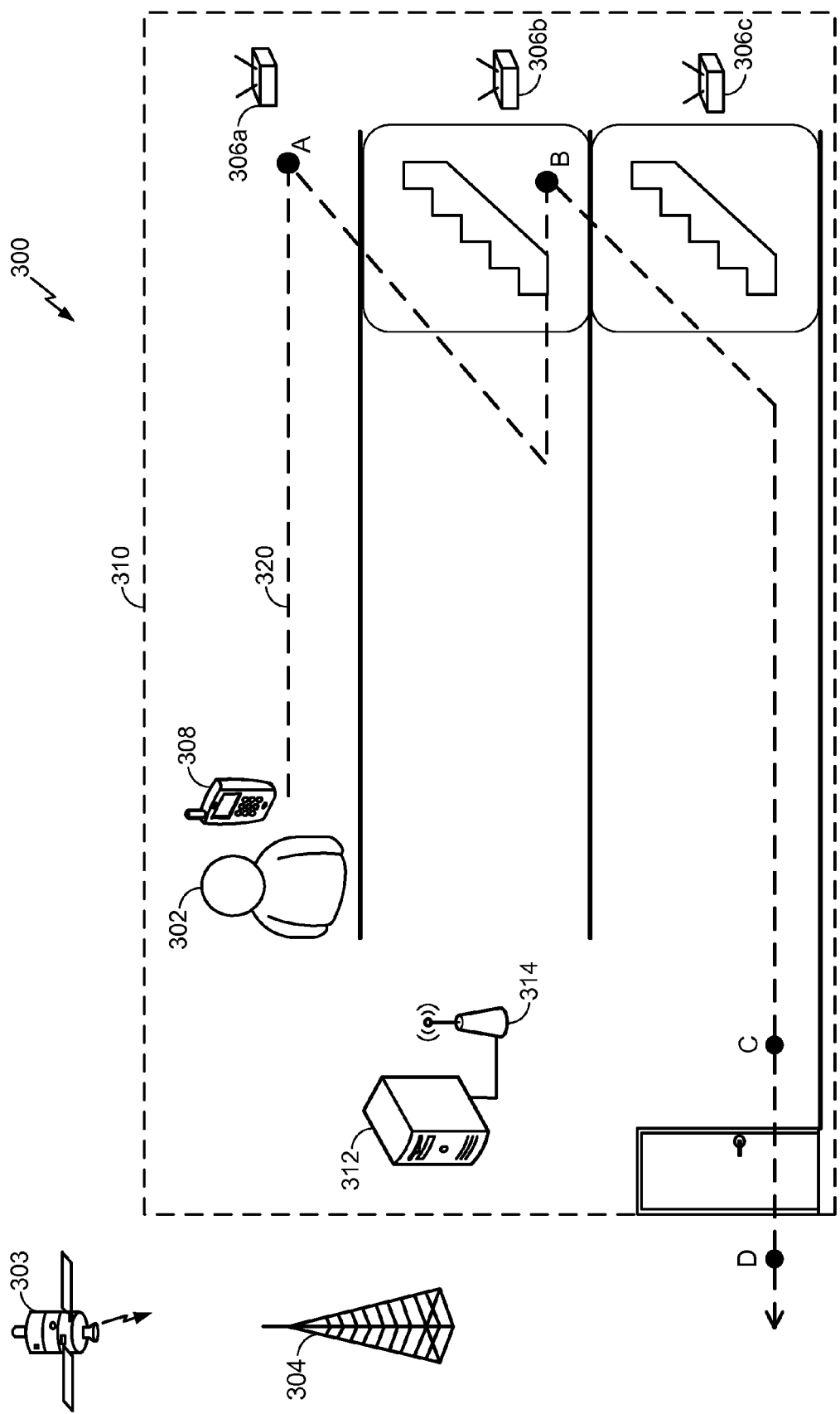
FIG. 3 is a diagram of example indoor/outdoor environments in which a user travels with a mobile device.

As noted, a mobile device may implement predictive navigation tasks operations, such as performing one or more navigations tasks in accordance with a list, and based on proximity to one or more points along a computed route of travel. To illustrate example operations of a system configured to perform predictive navigation tasks operations, reference is made to FIG. 3, showing a diagram of an example indoor/outdoor environment 300 in which a user 302 travels with a mobile device 308.

As shown, the user 302 may wish, in this example, to move from its current location inside an indoor structure 310 (e.g., an office building, a shopping mall, etc.) to an outdoor location. The user 302 may be equipped with the mobile device 308, which may be similar to the mobile devices 108 and/or 200 described in relation to FIGS. 1 and 2, respectively. The user's intention to travel outside of the indoor structure 310 may be communicated via a user interface, similar to the user interface modules 250-256 of the example mobile device 200 depicted in relation to FIG. 2. For example, the user may provide text-data, voice data, etc., to an application program that receives that user information indicative of the user's intended destination location. The destination location may be specified as a name of a place, a point on a map (displayed on the mobile device's screen), an address, geographical coordinates, etc. In some embodiments, the starting location may be assumed to be the user's current location, as may be determined by a position determination procedure implemented on the mobile device 308 or remotely at a remote server, such as a remote server 312 depicted in FIG. 3. Alternatively, in some embodiments, the starting location may be specified as a name of a place (provided by the user through a voice-interface, a keypad, or some other interface), a point on a map (displayed on the mobile device's screen), an address, geographical coordinates, etc. As noted, while located in an indoor environment, where signals from an SPS might not be received, the location of the mobile device 308 may be determined from signals received from one or more wireless access points with which the mobile device 308 is in communication. In the example of FIG. 3, the mobile device 308 may be in communication with the access points (transceivers) 306a, 306b and 306c (e.g., WiFi-based access points, Bluetooth transceivers, cellular access points, etc.) that are positioned within range of the mobile device 308. The access points 306a-c may also be in communication with the remote server 312 (which may be directly coupled to the access points, or, as depicted in FIG. 3, may communicate with those access points wirelessly via a transceiver/access point 314).

In some embodiments, location of the mobile device 308 may be determined based on such metrics as, for example, RSSI and/or RTT, determined by the mobile device 308. Generally, the determined RSSI and/or the RTT, corresponding to measurements of signals received from one or more access points (each of which may be identified by an access point identifier, such as a unique MAC address associated with the access point) can be used to determine an estimate of the device's location. For example, a database (which may be stored at the mobile device 308, at a positioning server, such as the positioning server 110 shown in FIG. 1, at the remote serer 312, or at some other device or server) containing geographic locations, power profiles and RTT's for multiple access points with known geographical positions may be compared to currently determined RSSI and/or RTT values. Using these known positions, the relative distances of the mobile device 308 to the access points may be determined, and an approximate geographic location of the device may be computed/derived (e.g., using multilateration procedures, such as a trilateration procedure). In some embodiments, the position of the mobile device may be also be determined, for example, by comparing the actual measured values of signal strength (or RSSI) and RTT obtained from one or more access points, to stored profiles to identify a profile matching (approximately or precisely) the set of metric values determined by the mobile device. A location estimate associated with a matching stored profile may then be deemed to be an estimate of the current location of the mobile device 308.

In embodiments in which the access points with which the mobile device 308 is in communication while traveling indoors are part of a QUIPS implementation, positioning determination for the mobile device may be performed as follows. Initially, the mobile device 308, executing a QUIPS-based application, may initiate an LCI discovery process (an LCIs, or location context identifiers, refers to identifiers associated with such geographical areas as, for example, floors of a building). In some embodiments, the discovery process first sends a request to a server that identifies all LCIs in the vicinity of a mobile device based on some coarse position, or based on the MAC id's that are seen/detected by the mobile device. The Server returns a set of candidate LCIs to the mobile with a list of access points. The set of candidate LCIs corresponds to a position estimate with a relatively high uncertainty value. Following the LCI discovery process, an LCI disambiguation process is performed, where the mobile device may use multiple criteria, such as the number of access points currently visible from each LCI (e.g., number of access points currently visible from each floor), maximum RSSI values from each LCI, median RSSI values from each LCI, etc., to choose an LCI from the candidate list. The chosen LCI represents a position estimate that is finer (i.e., has a lower uncertainty) than the position estimate resulting from the LCI discovery process. Once an LCI from a set of candidate LCIs, has been chosen, a positioning process based on, for example, RSSI and/or RTT may be performed. For example, targeted scans of access point(s), limited to those associated with the selected LCI, provide the RSSI or RTTs required by mobile device (e.g., through a positioning application) to determine a position approximation for the mobile device. These scans may be performed periodically and the positioning application (e.g., a positioning engine) can produce either a single shot fix or track the mobile over time.

Thus, based on the determined current location of the mobile device 308, and a selected destination location, a route of travel, such as a route of travel 320 shown in FIG. 3, to be traversed by the user 302 (and by extension, by the mobile device 308 the user is carrying) is determined, either by a process implemented by the mobile device, or by a process implemented by a remote server. In either situation, one or more routes of travel for the user from the current location to the destination point are determined. Particularly, map data may be used to identify feasible routes that can be taken to have the user move from the current starting location to the end destination location (as may have been specified by the user, or as may have been automatically specified by, for example, a pre-determine schedule). If more than one feasible route is identified, a route from the multiple identified routes which best meets some pre-determined criterion (e.g., shortest route, fastest route, etc.) is selected.

Based on the route of travel obtained for the mobile device, a list of navigation tasks that are to be performed along the route of travel is obtained. Here too, the list of navigation tasks may be determined at a remote server, such as the remote server 312, and once generated, the mobile device 308 may obtain the list by receiving a communication (e.g., a wireless communication) from the remote server 312, via an access point or a transceiver 314 in communication with server 312, that determined/generated the list. In some embodiments, the list of navigation tasks may be determined, at least partially, locally at the mobile device itself. For example, a remote server may determine the list of navigation tasks to specify tasks to be determined along some of the points along the determined route of travel, but may not be able to specify all the necessary navigation tasks data required. This may occur when the server does not have full information pertaining to the specific configuration of the mobile device, e.g., what communication protocol(s) the device may be configured to operate in, what sensors, receivers, and other modules the mobile device may have, etc. Additionally, the remote server 312 may not have sufficiently detailed map data to enable determination of all the points along the route at which certain navigation tasks may be performed. For example, the server may not have high-detail resolution of geographic area in which the user and the mobile device will be travelling. In either case (i.e., when the remote server does not have complete information about the configuration and/or functionality of the mobile device, or does not have complete details about the geography associated with the determined route), the server may determine a partial list of navigation tasks, and communicate the partially determined list to the mobile device 308). The mobile device may then complete whatever navigation tasks details that the server was not able to complete. In some embodiments, the list of navigation tasks may be determined (e.g., computed or derived) substantially entirely by the mobile device itself.

In determining the list of navigation tasks for the mobile device, points along the determined route of travel (in this example, the route of travel 320) where some navigation operation may need to be performed are identified. Those points may include points (also referred to as task points) corresponding to geographic locations where changes in the environments in which the mobile device is traveling are expected. These environment changes include changes in the operational environment, which may include changes to the communication capabilities available in the changing operational environments, and/or changes to the actual geographic environment, such as transitioning from an indoor environment to an outdoor environment. In the example illustration of FIG. 3, four (4) task points are shown, namely, points A, B, C, and D. However, any route of travel may include more or fewer task points. The points A, B, C, D, represent expected transition points where, in this example, the mobile device moves into a different geographical environment and/or to a new operation environment. For example, point A is a point preceding the point where the user (and thus the mobile device) will move from the top floor of the indoor structure 310 to the middle floor. Accordingly, if the mobile device is employing a map application displaying a local floor map, a navigation task that may need to be performed is to obtain (e.g., download from the remote server 312 via the transceiver 314, or from a server connected to any one of the access points 306a-c or 304) a floor map for the middle floor of the indoor structure 310.

In some embodiments, a list of navigation tasks may also include controlling the activation of a plurality of units of the mobile device during travel of the mobile device along its route of travel, including such units as the device's various sensors (e.g., a pressure sensor, an accelerometers, a magnetometer, a gyroscope, etc.), an indoor positioning receiver, a satellite position system (SPS) receiver (GNSS receiver), a communication transceiver (more than one transceiver may be included with a mobile device), etc. Such controlled activation may include, in some embodiments, enabling at least one of the plurality of units, disabling the at least one of the plurality of units, or preventing activation of the at least one of the plurality of units (e.g., not letting a user activate certain modules/features of the mobile device). Assume, for the example of FIG. 3, that the access points 306a and 306b are implemented based on different technologies. For example, the access point 306a may implement one type of WiFi-based communication technology (e.g., OFDM-based WiFi), while the access point 306b may implement a different type of WiFi-based communication technology (e.g., TDMA-based WiFi). Accordingly, assuming that the mobile device will establish a communication link with the access point 306b as it moves from the top floor to the middle floor of the indoor structure 310, another navigation task that may be associated with point A (or alternatively with point B or a point in between points A and B) may be to reconfigure the device so that the communication link with access point 306a is suspended when it moves into the middle floor, and a communication link with the access point 306b is established. In some embodiments, the mobile device 308 may have separate transceivers for each of the different WiFi-modes implemented by the access points 306a and 306b, and thus one example set of navigation tasks associated with point A or point B may be to suspend the communication link between the mobile device 308 and the access point 306b (which may also include deactivating a dedicated transceiver on the mobile device 308 used for that communication link), and establish a new communication link between the mobile device 308 and the access point 306b in accordance with the communication technology (mode/protocol) implemented by the access point 306b (which may involve activating another dedicated transceiver configured to establish that type of a communication link). There may be additional tasks associated with either the points A, B and/or some point in between, pertaining to the change in the mobile device's geographical and operational environments as it moves to the middle floor of the indoor structure 310. In some embodiments, controlled activation may also include controlled activation of one or more positioning modes of a mobile device (e.g., activating outdoor positioning mode of the device when exiting to an outdoor area from an indoor area, or, conversely, activating indoor positioning mode when entering an indoor area).

As noted, in some embodiments, the various navigation tasks that are to be performed along a route of travel may be provided in a list of navigation tasks. With reference to FIG. 4, an example embodiment of a list 400 of navigation tasks (which may be generated by a remote server and/or the mobile device) is shown. The example list 400 may include a column 410 identifying the task ID number (in this example, the tasks IDs are simply numbered as an ordered numbered list of 1, 2, 3, . . . , etc.), a performance location column 412, and "Tasks to be Performed" column 414. The performance location column 412 may include location information corresponding to the geographical position where performance of the tasks associated with this location, as specified in column 414, is to be commenced. In some embodiments, the location information may be provided as, for example, geographical coordinates in a frame of reference corresponding to a current map used by the mobile device. For example, at some point prior to the user setting out on the route of travel (e.g., the route of travel 320 of FIG. 3), the mobile device 308 may have obtained a local map of the top floor of the building structure. Accordingly, the location information for a point such as the point A shown in FIG. 3 may be provided in terms of that map. In some embodiments, the location information in the list 400 may be provided in terms of absolute geographical coordinates, and may include such information such as latitude, longitude and altitude coordinates. Other types/formats of location information may also be used. The tasks to be performed may be provided as instructions/commands to be performed by the mobile device 308. In the example of FIG. 4, the tasks specified are provided as descriptions of the tasks that need to be performed. However, the data included in this column may be formatted according to one or more coding conventions implemented for performance of navigation tasks.

Thus, with respect to the first set of navigation tasks, specified in row 420 of FIG. 4, corresponding to possible navigation tasks that are to be performed at the point A of FIG. 3, the location information for point A may be provided in absolute geographical coordinates (in which case, altitude measurements, obtained via an altitude or pressure sensor, would be required), or provided in relation to a local map for the top floor of the indoor structure 310. The tasks associated with that position include, in this example, obtaining assistance data, such as map data, for the middle floor of the indoor structure 310, activating/reconfiguring a transceiver of the mobile device 308 to communicate with the access point 306b, and deactivating/reconfiguring a transceiver of the mobile device 308 to suspend/drop communication link with the access point 306a (if the mobile device 308 includes dedicated transceivers for multiple communication modes/technologies, the device may activate one of the dedicated transceiver; if the same transceiver communicating with the access point 306a is to communicate with the access point 306b, that transceiver may need to be reconfigured). In some embodiments, the list 400 may also include any additional necessary information required to perform the tasks such as, in the case of activating or reconfiguring transceiver(s) to communicate with the various access points in the indoor structure 310, passwords, encryption keys, etc.

In a similar manner to the determination of navigation tasks for the point A, navigation tasks are determined for points B, C, and D. Particularly, as further shown in FIG. 3, after reaching point A on the route of travel 320 (at which points the tasks/actions specified in row 420 may be performed), the mobile device 308 is next supposed to reach point B, where the device will start transitioning from the middle floor to the bottom floor of the indoor structure 310. Assume, for the purpose of this example, that the access point 306c implements a different communication technology than that implemented for the access point 306b (e.g., a different WiFi mode, or communication technology other than one based on WiFi). Accordingly, navigation tasks that may need to be performed at point B (as also specified in row 422 of FIG. 3) may include, for example, activating/deactivating a transceiver configured to communicate with the access points 306c and 306b, respectively (or alternatively, reconfiguring one of the mobile device's transceivers to be able to communicate with the access point 306c), and obtaining map information for the bottom floor of the indoor structure 310 (if the mobile device 308 does not already have that information). Other navigation tasks may also need to be performed at point B After reaching point B, the user 302 (and thus the mobile device 308) are scheduled to travel outside the indoor structure, where signals from SPS satellites can be received. To expedite the processing required for obtaining satellite signals in order to determine the mobile device's position, satellite signal acquisition assistance data (also referred to as satellite positioning assistance data) may be obtained by the mobile device 308 (e.g., received from a remote server or determined/computed, at least in part, at the mobile device), including assistance data such as code phases, Doppler and corresponding uncertainty windows, satellite availability data, subset of satellites from which signals are to be acquired, ephemeris, almanacs, differential corrections, precise timing and any other data that can be obtained from, for example, an AGPS server. Other information could include predicted ephemeris for GNSS satellites valid for a week or so in the future. The mobile device generally uses this type of assistance data to reduce time to first fix. Accordingly, at point C on the route of travel 320, which corresponds to a location where the mobile device 308 is about to transition from an indoor environment to an outdoor environment, the list of navigation tasks may specify that the mobile device perform tasks that include requesting and/or computing signal acquisition assistance data (satellite positioning assistance data). Once the mobile device exits the indoor structure, it will be able to use the assistance data to expedite the acquisition of satellite signal. Another task that may be performed at point C is activation of an SPS receiver, such as the SPS receiver 208 of the mobile device 200 of FIG. 2 (the SPS receiver may, alternatively, be activated when the mobile device has reached the outdoor area), obtaining assistance data (e.g., map data) for the outdoor area into which the mobile device 308 is about to enter, etc. These example tasks are specified in row 424 of the list 400 of FIG. 4.

After reaching point C on the route of travel 320, the user 302 and the mobile device 308 are expected to exit the indoor structure 310. Once outside the indoor structure, communication with the access points 306a-c may become progressively degraded (as the mobile device 308 goes out of range of the indoor access points 306a-c). Accordingly, one navigation task that may have to be completed is to activate a transceiver to establish a communication link with access points/base stations that are available for communication with the mobile device 308. Thus, in the example of FIG. 3, the mobile device may be configured to activate a transceiver to communicate with the access point 304 (e.g., a cellular access point which may be part of a WWAN network). The mobile device may also, in accordance with the list of tasks, deactivate the transceiver used to communicate with the access point 306c, and thus drop or suspend the communication link that is to be established with the access point 306c when the mobile device 308 reaches point B on the route of travel. Alternatively, if a single transceiver is used for various modes of communication, that transceiver may be reconfigured to enable communication with an access point such as the access point 304.

Another navigation task that may be performed when the user transitions to an outdoor area and reaches point D is to activate the SPS receiver (unless the receiver has already been activated prior to entering the outdoor environment, as may have been done at point C of the route of travel). The mobile device 308 may also, at the point D, start acquiring satellite signals to enable position determination using SPS satellite. Acquisition of satellite signals may be facilitated by assistance data that may have been preemptively acquired/computed when the mobile device 308 reached, for example, the point C. Yet another task that may be performed at point D is to deactivate any sensor that may have been needed while the mobile device 308 was traveling indoor. For example, to determine the mobile device location in a multi-floor indoor structure, such as the indoor structure 310 (so as to, for example, determine the proximity of the mobile device 308 to the various designated locations identified in the list 400 where navigation tasks would need to be performed) a pressure sensor or altimeter may have been operating to enable determination of the altitude of the mobile device (as noted, locations specified in the list may include geographic coordinates that include altitude coordinates). Accordingly, once the mobile device 308 is situated outdoors, the pressure sensor or altimeter may no longer be necessary.

Thus, the possible navigation tasks that may be specified in the list 400 (at row 426) with respect to a position corresponding to the point D location on the route of travel 320 may include activating/reconfiguring a transceiver of the mobile device 308 to establish communication with the access point 304, deactivating/reconfiguring a transceiver of the mobile device 308 to suspend/drop communication link with the access point 306c, and acquiring signals from SPS satellites (such as the satellite 303 depicted in FIG. 3). Other tasks that may need to be performed when the mobile device 308 reaches point D (or any other point) on its route of travel 320 may also be required to be performed.

Determining schedules/lists of tasks that need to be performed may also be used in relation to devices other than mobile devices. Furthermore, schedules/lists of tasks that need to be performed may also be performed, in some embodiments, according to a time-based list/schedule where at least some tasks are associated with certain pre-determined time instances such that at those pre-determined time instances (which may also be specified at the list/schedule 400 of FIG. 4) those tasks are executed. For example, certain tasks, such as sensor calibration tasks, device maintenance and updating operations, etc., may need to be performed every certain time period, whether or not the mobile device has arrived at some pre-specified location where location-based tasks (e.g., navigation tasks) are performed. Accordingly, in some embodiments, performing one or more tasks (e.g., navigation tasks) may include performing the one or more tasks at one or more of, for example, various points of the route of travel and/or at various points of time during travel of the mobile device along the route of travel. As noted, navigation tasks may include the activation of various units (sensors, transceivers, and/or other modules) of a mobile device (such as any of the mobile device 108, 200, and 308, described in relation to FIGS. 1-3). In some embodiments, activating at least one unit of a device may include performing initialization of at least one unit of the mobile device, calibrating the at least one unit of the mobile device, and/or activating the at least one unit of the mobile device.

Continuing with the example of FIG. 3, having determined (e.g., by a remote server and/or locally by the mobile device) the schedule or list of tasks (navigation tasks) to be performed by the mobile device along the example route of travel 320, the user 302 carrying the mobile device 308 sets out along the route. In some embodiments, the route may be presented to the user on a map displayed on a screen (e.g., a route superimposed on a map of the area in which the user is located). In some embodiments, only part of the overall route may be displayed on a local map that shows only the immediate area where the user is located. For example, when the user embarks from the starting position (the far end of the top floor in the indoor structure 310 in the example of FIG. 3), only a local map of the top floor of the indoor structure 310 may be displayed. Other portions of the route may be displayed when maps of subsequent areas the user will travel are obtained by the mobile device 308 (which may be done in accordance with a list such as the list 400 of FIG. 4). As the user 302 begins to travel along the route, the user location (or rather, the location of the mobile device 308 the user is carrying) is periodically computed or updated (e.g., every 1 second, every 10 seconds, etc.) In some implementations, the rate of position determination or position update may increase as the user gets closer to one of the locations specified in the list. For example, upon determination that a user is within 30 feet from one of the locations specified in the list (such location being associated with one or more navigation tasks), the rate of position determination may increase from, for example, every 1 second, to every 0.5 second. As described herein, position/location determination of the mobile device may be performed based on, for example, multilateration techniques (e.g., determining RSSI or RTT parameters associated with received signals from one or more access points, and based on the known location of the access points determining the position of the mobile device), signal profile identification techniques (comparing determined parameter values of, for example, RSSI and/or RTT, to stored profiles that are associated with pre-determined positions), QUIPS-based methodologies, etc.

In some embodiments, the position determined for the mobile device is compared to location entries in a list/plan/schedule, e.g., comparing the determined location to the entries in the Performance Location column 412 of the list 400 of FIG. 4. If the current position determined for the mobile device 308 is in a format or positioning convention different than that specified in the list, the determined position may need to be converted to the format/convention used for specifying the locations specified in the list.

When the current position of the mobile device is determined to be proximate to one of the locations specified in the list of navigation tasks (for example, the mobile device is determined to within some pre-determined radius, e.g., 5 feet, from the position of the point A location), the tasks specified in the list in relation to the point A location begin to be performed. As noted, in some embodiments, the tasks specified in the list may be provided as general commands of a task that needs to be performed (e.g., "download map information," "activate a transmitter"), in which case a controller of the mobile device (such as, for example, the controller/processor 210 of the mobile device 200 depicted in FIG. 2) processes the commands to generate control signals to cause the operations to achieve the specified tasks. For example, in relation to the point A location, the list 400 may specify the task of "obtain assistance data for the middle floor of the indoor structure." In response, the controller of the mobile device may cause the performance of operations to achieve this task. For example, if the assistance data (such as, for example, map data and other types of assistance data) for the middle floor is already stored on the mobile device 308, the controller may cause operations to access the device's storage, locate the required assistance data, and retrieve the assistance data. If the require assistance data for the middle floor is not already stored on the device, the controller may cause operations to send (e.g., via one of the mobile device's transceivers) a request to a server (e.g., the server 312 shown in FIG. 3, or some other server on which the required assistance data data is stored) for the assistance data for the middle floor. The controller may then cause operations to receive the assistance data from the server, store the receive data and/or present the assistance data (e.g., maps) on the display of the mobile device. Thus, in such embodiments, the mobile device may be configured to request assistance data in response to a determination that the mobile device is located proximate to a point on the route of travel preceding another point on the route of travel corresponding to an area associated with the requested assistance data, and to receive the requested assistance data. Alternatively, the list may already specify the actual control signals and commands required to achieve the tasks associated with the location. As another example, a further tasks may specify that a transceiver of the mobile device is to be activated or reconfigured to communicate with access point 306b, and that a communication link to the access point is to be established. In response to this specified task, the controller may cause operations to generate the appropriate control signals or instructions required to achieve this task. Alternatively, in embodiments in which the list already includes the required control signals and instructions to achieve these tasks, those control signals and/or instruction are issued or performed.

Similarly, after completing the tasks associated with the point A location, and advancing to other points along the route of travel 320, the mobile device may perform the tasks specified in relation to those other points (for example, performing the tasks illustrated in row 422 of FIG. 4 when the mobile device is proximate to the point B location). When the mobile device 308 reaches a point proximate the point C location, which corresponds to a point of transition from an indoor area to an outdoor area, one task that may be performed by the mobile device is to obtain or compute satellite positioning assistance data to facilitate and expedite signal acquisition for SPS satellites once the mobile device reaches the outdoor area. When the mobile device reaches point D of the route of travel, which, in the example of FIG. 3, is located outdoors, the mobile device performs such navigation tasks as, for example, acquiring satellite signals using the obtained/computed assistance data, activating a transceiver to communicate with a transceiver of a WWAN, etc. Additionally, once the mobile device is outdoors and can substantially rely on signals from SPS satellite to determine its location, some of the device's sensors that enabled navigation in the indoor structure 310, including one or more of a pressure sensor, an altimeter, an accelerometer, a gyroscope, a magnetometer, etc., may be deactivated in order to preserve the mobile device's power.

In some embodiments, the user might deviate from the pre-planned route of travel such as the route of travel 320 (e.g., take a detour to, for example, to do window shopping inside a mall, take a route different than that computed based on the user's starting and destination positions, etc.) In some embodiments, in response to a determination that a mobile device is located at a non-predicted location that deviates from the route of travel for the mobile device, a revised list of navigation tasks may be determined. For example, the mobile device may use the new non-predicted location of the device (determined based on one or more location determination methodologies, such as those based on signal measurement from one or more access points, methodologies based on QUIPS, etc.) and the previously indicated destination location to compute a revised route of travel, and determine points along that new route (e.g., points corresponding to transitions from one geographical and/or operating environment to another) at which various navigation tasks need to be performed. A determination that a user deviated from the route of travel may also result in activation or deactivation of one or more of the device's sensors or other modules. For example, if it is determined that the user has deviated from its route of travel, one or more of the device's inactive transceivers may be activated to attempt establish a communication link with an access point that may be closer to the present position of the device than the access point with which the device is currently in communication. In some embodiments, a determination that a user a deviated from the original route of travel may be based on a determination that the mobile device is located at a distance exceeding some pre-determined distance from the nearest point along the route of travel and/or that the user has not been following the route of travel from more than some pre-determined period of time.

Figure 5:
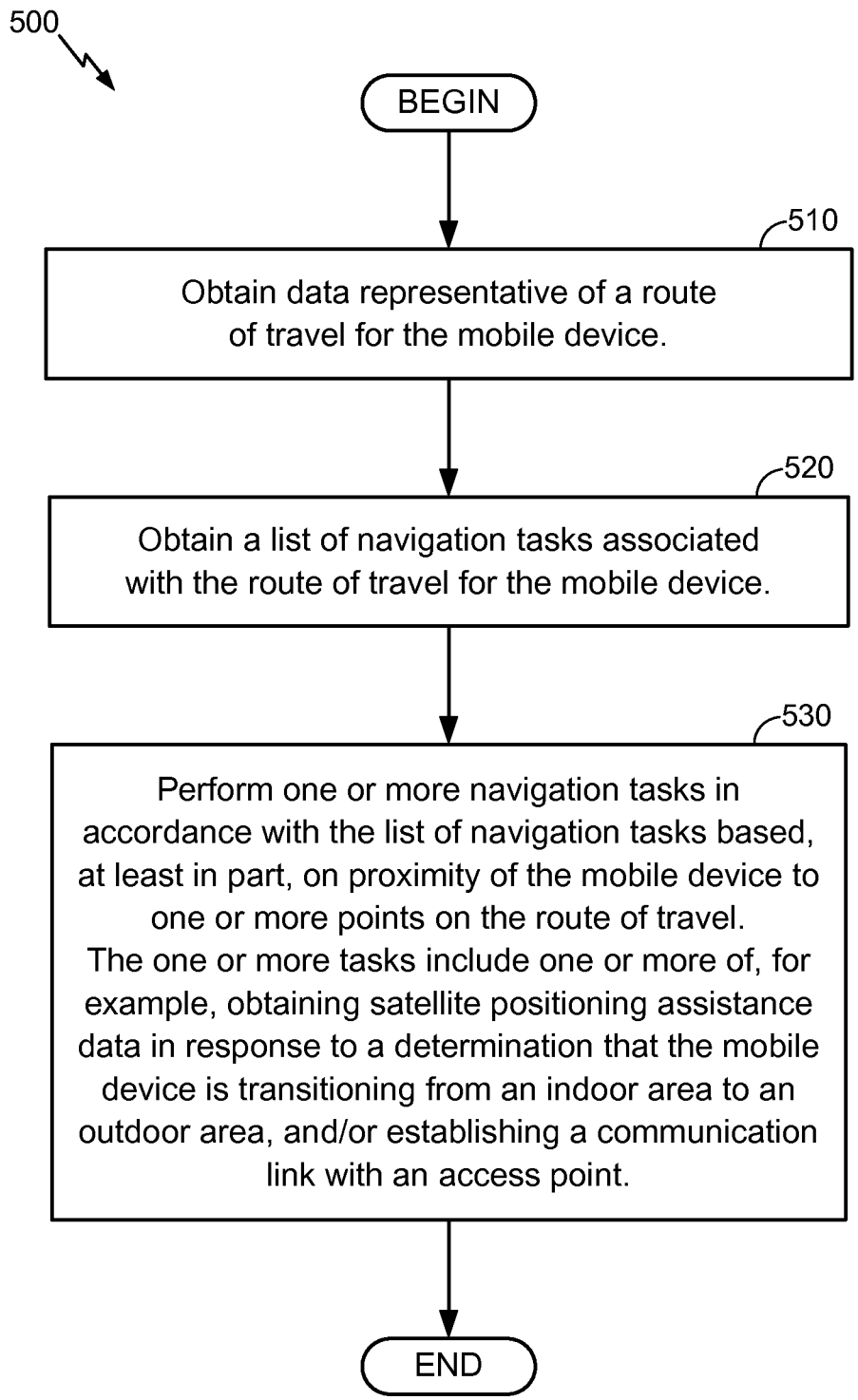
FIG. 5 is a flowchart of an example procedure to schedule and control navigation tasks.

With reference to FIG. 5, a flowchart of an example procedure 500 for scheduling and controlling navigation tasks on a mobile device is shown. The procedure 500 includes obtaining 510 data representative of a route of travel for the mobile device. As noted, in some embodiments, the mobile device may receive from the user (e.g., via an input interface) information indicating the user's desired destination (e.g., the user may provide a pinpoint location of the destination on a map displayed on the mobile device's screen, or he/she may provide an address or specify a name of a place, etc.) The destination location and a starting point location (which may be the mobile device's current location as determined through a multilateration processes, profile matching techniques, etc.) are then used to determine, based on assistance data (including, e.g., map data, which may be stored at the local device, or at a remote server to which the current and destination location have been communicated) one or more possible routes from the current location to the destination. As noted, the route determination may be performed at a server in communication with the mobile device and/or at the mobile device. Where more than one possible route is available, the route that best meets some criterion (shortest or fastest route) may be the route selected.

Having obtained the route of travel, a list of navigation tasks associated with the route of travel for the mobile device is obtained 520. In some embodiments, the list of navigation tasks is obtained by identifying points along the route where various navigation tasks would need to be performed, and determining the various navigation tasks that are to be performed at those points. The identified points may include points where the mobile device will transition from one geographical and/or operational environment to another geographic and/or operational environment. Changes to operational environments in which the mobile device is traveling may include, for example, changes to the communication capabilities available in the changing operational environments, and changes to the actual geographic environment in which the mobile device is operating may include transitioning from an indoor environment to an outdoor environment.

In accordance with the obtained list of navigation tasks, one or more of the tasks specified in list are performed 530 based on the proximity of the mobile device to one or more points along the route of travel that are associated with the tasks. Navigation tasks that may be specified in the list and performed when the mobile device is situated proximate to points associated with the particular tasks include, for example, controlling the activation of one or more units (e.g., sensors, receivers, transceivers, other modules) of the mobile device, obtaining assistance data, obtaining (e.g., computing) signal acquisition assistance data to facilitate satellite signal acquisition when the mobile device is about to transition from an indoor environment to an outdoor environment, establishing a communication link with an access point, controlling the activation of a device's one or more positioning modes, etc.

Figure 6:
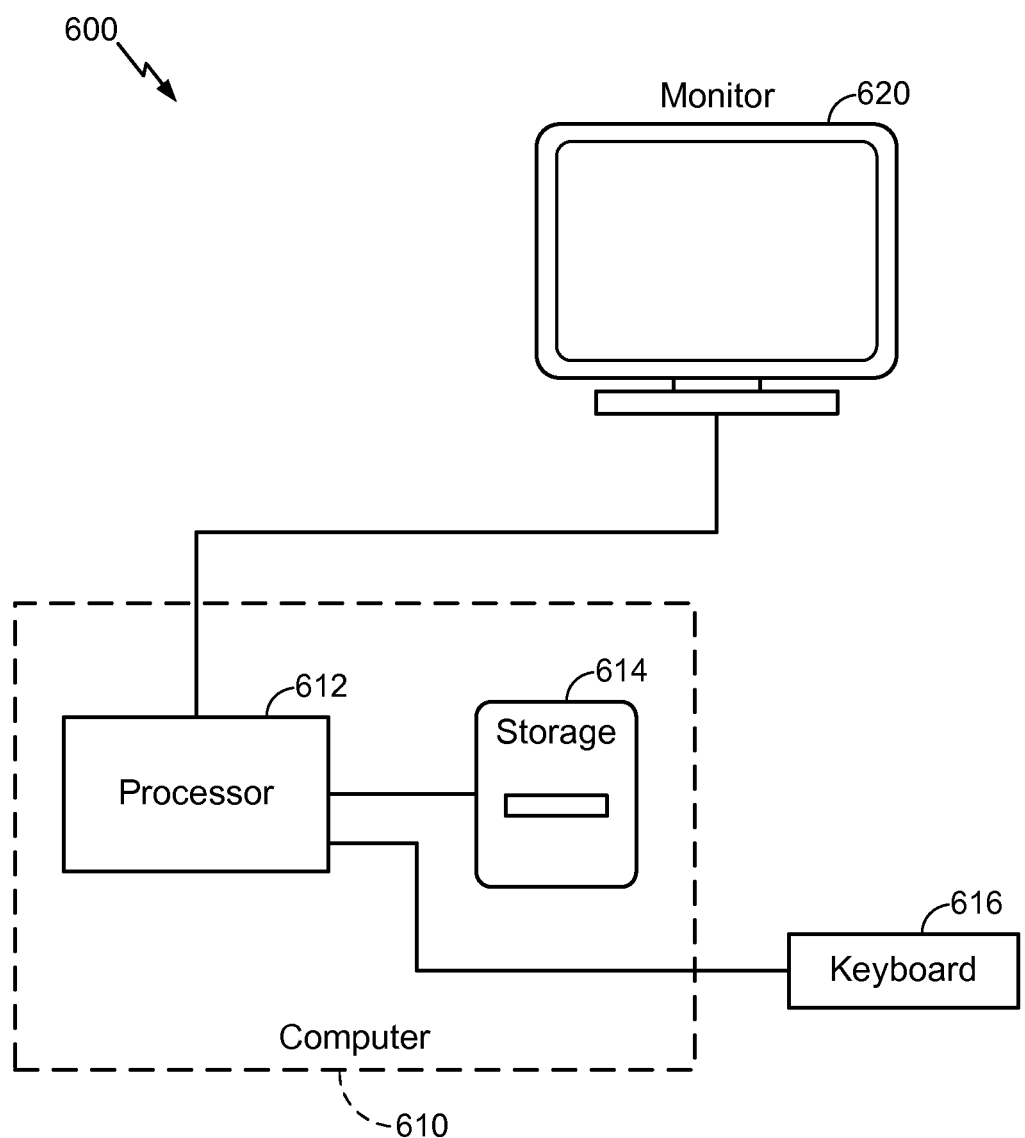
FIG. 6 is a schematic diagram of an example computing system.

Performing the procedures of scheduling and controlling of navigation tasks and/or location determination procedures described herein may be facilitated by a processor-based computing system. With reference to FIG. 6, a schematic diagram of an example computing system 600 is shown. The computing system 600 includes a processor-based device 610 such as a personal computer, a specialized computing device, and so forth, that typically includes a central processor unit 612. In addition to the CPU 612, the system includes main memory, cache memory and bus interface circuits (not shown). The processor-based device 610 may include a mass storage device 614, such as a hard drive and/or a flash drive associated with the computer system. The computing system 600 may further include a keyboard, or keypad, 616, and a monitor 620, e.g., a CRT (cathode ray tube) or LCD (liquid crystal display) monitor, that may be placed where a user can access them (e.g., a mobile device's screen).

The processor-based device 610 is configured to facilitate, for example, the implementation of procedures to plan/schedule and perform navigation tasks for a mobile device, and also to facilitate implementation of location determination procedures. The mass storage device 614 may thus include a computer program product that when executed on the processor-based device 610 causes the processor-based device to perform operations to facilitate the implementation of the above-described procedures. The processor-based device may further include peripheral devices to enable input/output functionality. Such peripheral devices may include, for example, a CD-ROM drive and/or flash drive, or a network connection, for downloading related content to the connected system. Such peripheral devices may also be used for downloading software containing computer instructions to enable general operation of the respective system/device. Alternatively and/or additionally, in some embodiments, special purpose logic circuitry, e.g., an FPGA (field programmable gate array), a DSP processor, or an ASIC (application-specific integrated circuit) may be used in the implementation of the computing system 600. Other modules that may be included with the processor-based device 610 are speakers, a sound card, a pointing device, e.g., a mouse or a trackball, by which the user can provide input to the computing system 600. The processor-based device 610 may include an operating system.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Memory may be implemented within the processing unit or external to the processing unit. As used herein the term "memory" refers to any type of long term, short term, volatile, nonvolatile, or other memory and is not to be limited to any particular type of memory or number of memories, or type of storage media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver receiving signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method of controlling navigation tasks on a mobile device, the method comprising:
    obtaining data representative of a route of travel for the mobile device;
    obtaining, prior to arriving at an area along the route of travel, a list of navigation tasks performable at the area along the route of travel; and
    performing, by the mobile device, one or more of the list of navigation tasks, at the area along the route of travel, based, at least in part, on proximity of the mobile device to the area along the route of travel, wherein performing the one or more of the list of navigation tasks includes one or more of: obtaining satellite positioning assistance data in response to a determination that the mobile device is transitioning from an indoor area to an outdoor area, or establishing a communication link with an access point.

2. The method of claim 1, wherein the mobile device comprises a plurality of units and configured to operate in multiple positioning modes, and wherein the list of navigation tasks includes control data to control activation of at least one of the plurality of units during travel of the mobile device along the route of travel.

3. The method of claim 2, wherein the plurality of units comprises one or more of: a pressure sensor, an accelerometer, a magnetometer, a gyroscope, an indoor positioning receiver, a global navigation satellite system (GNSS) receiver, or a communication transceiver.

4. The method of claim 2, wherein performing the one or more of the list of navigation tasks comprises:
    controlling activation of the at least one of the plurality of units based, at least in part, on the list of navigation tasks.

5. The method of claim 4, wherein controlling the activation of the at least one of the plurality of units comprises causing one of:
    enabling the at least one of the plurality of units;
    disabling the at least one of the plurality of units; or
    preventing the activation of the at least one of the plurality of units.

6. The method of claim 1, further comprising:
obtaining a revised list of navigation tasks in response to a determination that the mobile device is in a non-predicted location that deviates from the route of travel.

7. The method of claim 1, further comprising:
activating one or more units of the mobile device in response to a determination that the mobile device is in a non-predicted location that deviates from the route of travel.

8. The method of claim 7, wherein activating the one or more units of the mobile device comprises:
activating one or more inactive transceivers of the mobile device.

9. The method of claim 1, further comprising:
determining location of the mobile device based, at least in part, on location information determined based on measurements performed by the mobile device.

10. The method of claim 1, wherein performing the one or more of the list of navigation tasks comprises:
performing the one or more of the list of navigation tasks at one or more of: various points of the route of travel, or various points of time during travel of the mobile device along the route of travel.

11. The method of claim 1, wherein performing the one or more of the list of navigation tasks comprises:
controlling activation of at least one of positioning modes of the mobile device based, at least in part, on determined location of the mobile device.

12. The method of claim 1, wherein performing the one or of the list of more navigation tasks comprises:
performing initialization of at least one unit of the mobile device;
calibrating the at least one unit of the mobile device; and
activating the at least one unit of the mobile device.

13. The method of claim 1, wherein performing the one or more of the list of navigation tasks comprises:
requesting assistance data in response to a determination that the mobile device is located proximate to a point on the route of travel preceding another point on the route of travel corresponding to an area associated with the requested assistance data; and
receiving the requested assistance data.

14. The method of claim 1, wherein obtaining the satellite positioning assistance data comprises:
determining satellite availability data based on determined location of the mobile device, and determining a subset of satellites based on the determined satellite availability data.

15. The method of claim 14, further comprising:
determining that the mobile device is transitioning from the indoor area to the outdoor area based, at least in part, on one or more of: the list of navigation tasks, the determined location of the mobile device, or current time.

16. The method of claim 1, wherein obtaining the list of navigation tasks comprises:
generating at least part of the list of navigation tasks at one or more of: the mobile device, or a remote server in communication with the mobile device.

17. A mobile device comprising:
one or more processors; and
storage media comprising computer instructions that, when executed on the one or more processors, cause operations comprising:
obtaining data representative of a route of travel for the mobile device;
obtaining, prior to arriving at an area along the of travel, a list of navigation tasks performable at the area along the route of travel; and
performing, by the mobile device, one or more of the list of navigation tasks, at the area along the route of travel, based, at least in part, on proximity of the mobile device to the area along the route of travel, wherein performing the one or more of the list of navigation tasks includes one or more of: obtaining satellite positioning assistance data in response to a determination that the mobile device is transitioning from an indoor area to an outdoor area, or establishing a communication link with an access point.

18. The mobile device of claim 17, wherein the mobile device comprises a plurality of units, wherein the mobile device is configured to operate in multiple positioning modes, and wherein the list of navigation tasks includes control data to control activation of at least one of the plurality of units during travel of the mobile device along the route of travel.

19. The mobile device of claim 18, wherein the plurality of units comprises one or more of: a pressure sensor, an accelerometer, a magnetometer, a gyroscope, an indoor positioning receiver, a global navigation satellite system (GNSS) receiver, or a communication transceiver.

20. The mobile device of claim 17, wherein the storage media further comprises instructions to cause further operations comprising:
activating one or more units of the mobile device in response to a determination that the mobile device is in a non-predicted location that deviates from the route of travel.

21. The mobile device of claim 20, wherein the instructions that cause the operations of activating the one or more units of the mobile device comprise instructions that cause further operations comprising:
activating one or more inactive transceivers of the mobile device.

22. The mobile device of claim 17, wherein the storage media further comprises instructions to cause further operations comprising:
determining location of the mobile device based, at least in part, on location information determined based on measurements performed by the mobile device.

23. The mobile device of claim 17, wherein the instructions that cause the operations of performing the one or more of the list of navigation tasks comprise instructions that cause further operations comprising:
performing the one or more of the list of navigation tasks at one or more of: various points of the route of travel, or various points of time during travel of the mobile device along the route of travel.

24. The mobile device of claim 17, wherein the instructions that cause the operations of performing the one or more of the list of navigation tasks comprise instructions that cause further operations comprising:
requesting assistance data in response to a determination that the mobile device is located proximate to a point on the route of travel preceding another point on the route of travel corresponding to an area associated with the requested assistance data; and
receiving the requested assistance data.

25. The mobile device of claim 17, wherein the instructions that cause the operations of obtaining the satellite positioning assistance data comprise instructions that cause further operations comprising:

determining satellite availability data based on determined location of the mobile device, and determining a subset of satellites based on the determined satellite availability data.

26. The mobile device of claim 25, wherein the storage media further comprises instructions to cause further operations comprising:
determining that the mobile device is transitioning from the indoor area to the outdoor area based, at least in part, on one or more of: the list of navigation tasks, the determined location of the mobile device, or current time.

27. The mobile device of claim 17, wherein the instructions that cause the operations of obtaining the list of navigation tasks comprise instructions that cause further operations comprising:
generating at least part of the list of navigation tasks at one or more of: the mobile device, or a remote server in communication with the mobile device.

28. A communication apparatus comprising:
means for obtaining data representative of a route of travel for a mobile device;
means for obtaining, prior to arriving at an area along the of travel, a list of navigation tasks performable at the area along the route of travel; and
means for performing, by the mobile device, one or more of the list of navigation tasks, at the area along the route of travel, based, at least in part, on proximity of the mobile device to the area along the route of travel, wherein the means for performing the one or more of the list of navigation tasks include one or more of: means for obtaining satellite positioning assistance data in response to a determination that the mobile device is transitioning from an indoor area to an outdoor area, or means for establishing a communication link with an access point.

29. The apparatus of claim 28, wherein the mobile device comprises a plurality of units, wherein the mobile device is configured to operate in multiple positioning modes, and wherein the list of navigation tasks includes control data to control activation of at least one of the plurality of units during travel of the mobile device along the route of travel.

30. The apparatus of claim 29, wherein the plurality of units comprises one or more of: a pressure sensor, an accelerometer, a magnetometer, a gyroscope, an indoor positioning receiver, a global navigation satellite system (GNSS) receiver, or a communication transceiver.

31. The apparatus of claim 28, further comprising:
means for activating one or more units of the mobile device in response to a determination that the mobile device is in a non-predicted location that deviates from the route of travel.

32. The apparatus of claim 31, wherein the means for activating comprise:
means for activating one or more inactive transceivers of the mobile device.

33. The apparatus of claim 28, further comprising:
means for determining location of the mobile device based, at least in part, on location information determined based on measurements performed by the mobile device.

34. The apparatus of claim 28, wherein the means for performing the one or more of the list of navigation tasks further comprise:
means for performing the one or more of the list of navigation tasks at one or more of: various points of the route of travel, or various points of time during travel of the mobile device along the route of travel.

35. The apparatus of claim 28, wherein the means for performing the one or more of the list of navigation tasks further comprise:
means for requesting assistance data in response to a determination that the mobile device is located proximate to a point on the route of travel preceding another point on the route of travel corresponding to an area associated with the requested assistance data; and
means for receiving the requested assistance data.

36. The apparatus of claim 28, wherein the means for obtaining the satellite positioning assistance data comprise:
means for determining satellite availability data based on determined location of the mobile device, and determining a subset of satellites based on the determined satellite availability data.

37. The apparatus of claim 36, further comprising:
means for determining that the mobile device is transitioning from the indoor area to the outdoor area based, at least in part, on one or more of: the list of navigation tasks, the determined location of the mobile device, or current time.

38. The apparatus of claim 28, wherein the means for obtaining the list of navigation tasks comprise:
means for generating at least part of the list of navigation tasks at one or more of: the mobile device, or a remote server in communication with the mobile device.

39. A non-transitory processor-readable media programmed with a set of instructions executable on a processor that, when executed, cause operations comprising:
obtaining data representative of a route of travel for a mobile device;
obtaining, prior to arriving at an area along the route of travel, a list of navigation tasks performable at the area along the route of travel; and
performing, by the mobile device, one or more of the list of navigation tasks, at the area along the route of travel, based, at least in part, on proximity of the mobile device to the area along the route of travel, wherein performing the one or more of the list of navigation tasks includes one or more of: obtaining satellite positioning assistance data in response to a determination that the mobile device is transitioning from an indoor area to an outdoor area, or establishing a communication link with an access point.

40. The processor-readable media of claim 39, wherein the mobile device comprises a plurality of units, wherein the mobile device is configured to operate in multiple positioning modes, and wherein the list of navigation tasks includes control data to control activation of at least one of the plurality of units during travel of the mobile device along the route of travel.

41. The processor-readable media of claim 40, wherein the plurality of units comprises one or more of: a pressure sensor, an accelerometer, a magnetometer, a gyroscope, an indoor positioning receiver, a global navigation satellite system (GNSS) receiver, or a communication transceiver.

42. The processor-readable media of claim 39, further comprising instructions to cause further operations comprising:
activating one or more units of the mobile device in response to a determination that the mobile device is in a non-predicted location that deviates from the route of travel.

43. The processor-readable media of claim 42, wherein activating the one or more units of the mobile device comprises:

activating one or more inactive transceivers of the mobile device.

44. The processor-readable media of claim 39, further comprising instructions to cause further operations comprising:
  determining location of the mobile device based, at least in part, on location information determined based on measurements performed by the mobile device.

45. The processor-readable media of claim 39, wherein performing the one or more of the list of navigation tasks comprises:
  performing the one or more of the list of navigation tasks at one or more of: various points of the route of travel, or various points of time during travel of the mobile device along the route of travel.

46. The processor-readable media of claim 39, wherein performing the one or more of the list of navigation tasks comprises:
  requesting assistance data in response to a determination that the mobile device is located proximate to a point on the route of travel preceding another point on the route of travel corresponding to an area associated with the requested assistance data; and
  receiving the requested assistance data.

47. The processor-readable media of claim 39, wherein obtaining the satellite positioning assistance data comprises:
  determining satellite availability data based on determined location of the mobile device, and determining a subset of satellites based on the determined satellite availability data.

48. The processor-readable media of claim 47, further comprising instructions to cause further operations comprising:
  determining that the mobile device is transitioning from the indoor area to the outdoor area based, at least in part, on one or more of: the list of navigation tasks, the determined location of the mobile device, or current time.

49. The processor-readable media of claim 39, wherein obtaining the list of navigation tasks comprises:
  generating at least part of the list of navigation tasks at one or more of: the mobile device, or a remote server in communication with the mobile device.

\* \* \* \* \*